Figure 4:
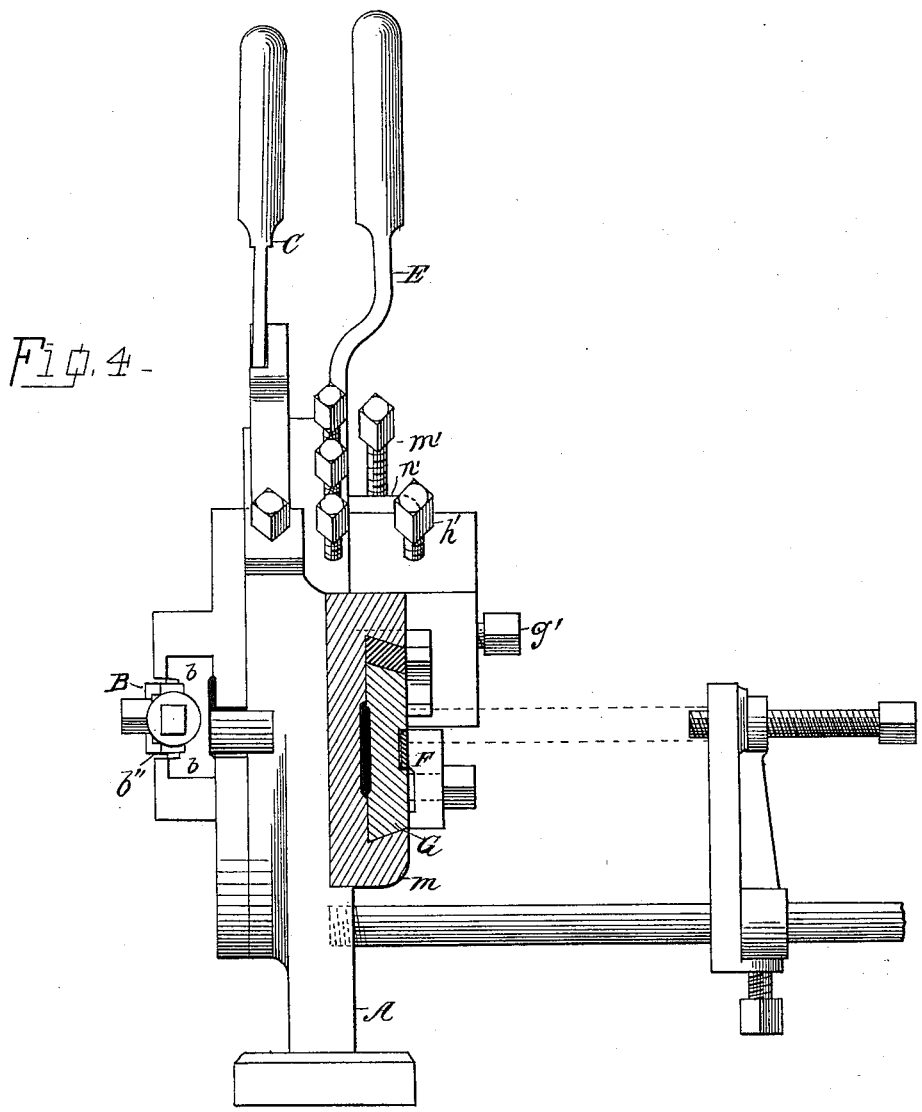

(No Model.) 4 Sheets—Sheet 1.
A. SAUNDERS.
MACHINE FOR CUTTING OR SCREW THREADING RODS, TUBES, &c.
No. 364,962. Patented June 14, 1887.
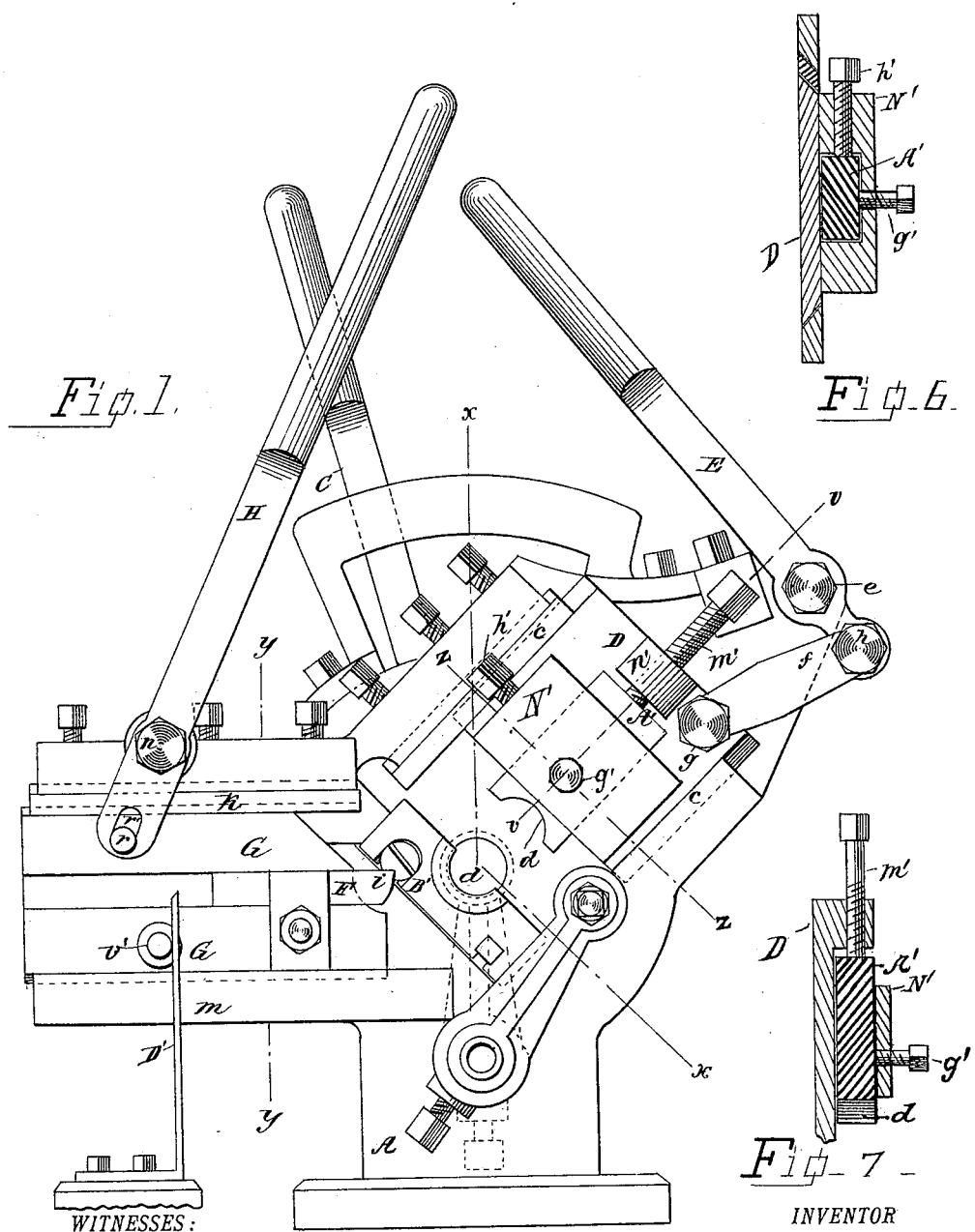
WITNESSES:
C. W. Benjamin
Charles A. Herbert.
INVENTOR
Alexander Saunders
BY
James A. Whitney
ATTORNEY

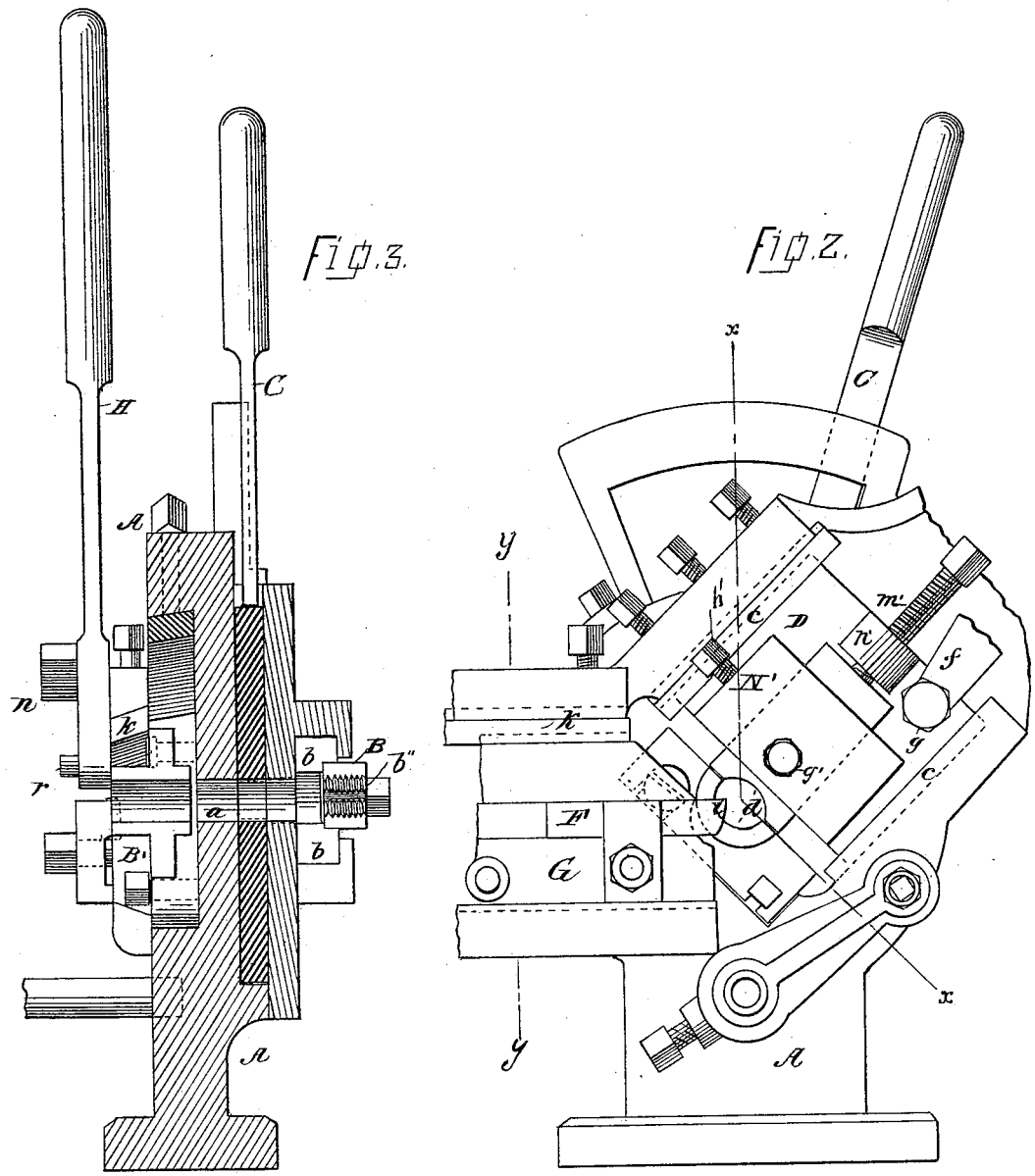

(No Model.) 4 Sheets—Sheet 3.

A. SAUNDERS.
MACHINE FOR CUTTING OR SCREW THREADING RODS, TUBES, &c.

No. 364,962. Patented June 14, 1887.

WITNESSES:
OW Benjamin
Charles A. Herbert

INVENTOR
Alexander Saunders
BY
James A. Whitney
ATTORNEY (No Model.) 4 Sheets—Sheet 4.
A. SAUNDERS.
MACHINE FOR CUTTING OR SCREW THREADING RODS, TUBES, &c.
No. 364,962. Patented June 14, 1887.
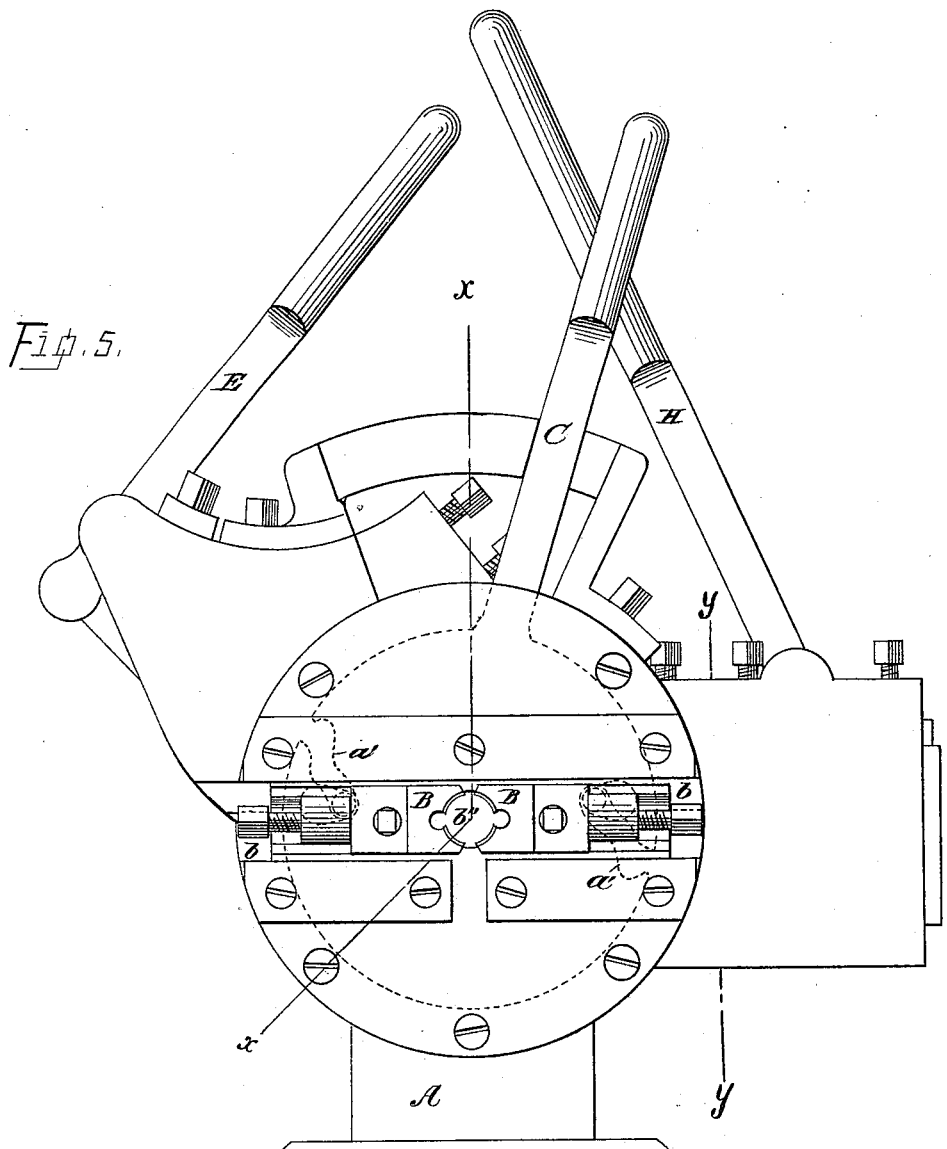

UNITED STATES PATENT OFFICE.

ALEXANDER SAUNDERS, OF YONKERS, NEW YORK, ASSIGNOR TO D. SAUNDERS' SONS, OF SAME PLACE.

MACHINE FOR CUTTING OR SCREW-THREADING RODS, TUBES, &c.

SPECIFICATION forming part of Letters Patent No. 364,962, dated June 14, 1887.

Application filed February 28, 1887. Serial No. 229,123. (No model.)

*To all whom it may concern:*

Be it known that I, ALEXANDER SAUNDERS, of Yonkers, in the county of Westchester and State of New York, have invented certain Improvements in Machines for Working Pipes, Cylindrical Rods, &c., of which the following is a specification.

This invention is designed for cutting pipes, cylindrical rods, and the like, and certain portions thereof are also designed for cutting screw-threads on such pipes or rods in connection with the severing or cutting of the same.

My invention comprises certain novel combinations of parts, whereby I provide an apparatus capable of being operated for the purposes above indicated with very great convenience, speed, and effectiveness.

Figure 1 is an end view of a machine embracing my said invention. Fig. 2 is an end view corresponding to Fig. 1, but showing the parts in a modified relation with each other. Fig. 3 is a vertical longitudinal sectional view taken in the line $x\ x$ of Figs. 1, 2, and 5. Fig. 4 is a vertical longitudinal sectional view taken in the line $y\ y$ of Figs. 1, 2, and 5. Fig. 5 is a view of the end opposite that represented in Figs. 1 and 2. Fig. 6 is a detail sectional view taken in the line $z\ z$ of Fig. 1; and Fig. 7 is a detail sectional view taken in a plane at right angles to that of Fig. 6—that is to say, in the line $v\ v$ of Fig. 1.

A is the stock or standard of the machine, constructed with a central opening, $a$. At the front of said stock are provided the threading-dies B B, which are brought to and from each other by means of a lever, C, connected to a disk, (represented in the dotted outline in Fig. 5,) which, by means of suitable slots, also indicated in dotted outline at $a'$ in said view, connect with pins on the shanks of the dies B B to move the same in the guide $b$. This construction of the threading or screw-threading chuck is set forth in detail and with the requisite accessories in the Letters Patent granted to me on the 5th day of May, A. D. 1885, and numbered 317,022, wherefore specific description of said screw-cutting chuck and its threading dies B B is not here necessary.

Any suitable construction of screw-cutting chuck may be substituted for the specific construction above indicated, it being only necessary for the purposes of my present invention that suitable threading-dies, B B, capable of movement or adjustment with reference to each other and actuated by a lever, C, should be provided, with the axis of the dies B B substantially coincident with the axis of the divided bushing, hereinafter more fully set forth.

Placed in suitable guides, $c\ c$, is a slide, D, upon which is secured the section $A'$ of a bushing, the opposite section, $B'$, of which is fixed to the frame of the machine. The coincident and opposite ends of the sections $A'$ and $B'$ of the bushing are semicircularly recessed, as shown at $d$, so that when the two sections $A'$ and $B'$ are brought together the recesses $d\ d$ are opposite each other, and so that the approximately-circular space provided by the coincidence and contiguity of the said two recesses is substantially in line with the space or center $b''$ of the threading-dies B B, the opening $a$ being between, so that a pipe or cylindrical rod introduced through or between the dies B B, as in the ordinary operation of cutting a screw-thread thereon, may pass between the sections $A'$ and $B'$, and the latter being brought together, as hereinbefore explained, be steadied thereby, the semicircular shape of the recesses $d\ d$ conforming more or less to the circumference of the cylindrical rod or pipe, as the case may be, to support the same against the action of the cutting devices, as hereinafter presently explained. The slide D, and consequently the sliding section $A'$ of the bushing, is actuated by a lever, E, pivoted, as shown at $e$, and connected in any suitable manner—as, for example, by a link, $f$, and pivots $g$ and $h$—with the said slide D, so that by a simple movement of the said lever the slide, and consequently the movable section $A'$ of the bushing, may be rapidly and readily withdrawn to the position represented in Fig. 1 to release the rod or pipe, or brought inward to the position represented in Fig. 2 to support and steady the same against the lateral pressure of the cutter in transversely severing said rod or pipe. The cutter is shown at F, its cutting-edge being indicated at $i$. This cutter is carried by a slide, G, which works in suitable guides, $k$ and $m$. Said cutter is arranged to move in a line transverse to the axis of the pipe or rod passed through the threading-dies and through the bushing A' and B', as hereinbefore explained, and it is conveniently and rapidly moved to and from the pipe or cylindrical rod to be cut or severed by means of a lever, H, pivoted, as shown at $n$, and connected with the slide G by any suitable means—as, for example, by a lateral pin or stud, $r$, extended through a slot, $r'$, in the short arm of the lever.

By the construction and arrangement of parts hereinbefore set forth and described the several operations of adjusting the threading-dies B B to the pipe or cylindrical rod to cut the threads thereon or to release the same, of bringing the sections A' B' together to clasp and steady and support the pipe or rod while passing through the machine and for releasing the same, and of bringing the cutter against and in due relation with the pipe or rod to cut or sever the same and to withdraw said cutter when the operation is completed, are all performed with very great quickness, convenience, and certainty, and a materially greater quantity of work can be performed in a given time with a machine embodying the several features of my said invention than with other machines designed for the same purpose, but devoid of said features. It is of course to be understood that the pipe or cylindrical rod, as the case may be, is passed into the machine to and through the dies B B in substantially the same manner as into a screw-threading device of the class illustrated in my Letters Patent dated May 5, A. D. 1885, No. 317,022, hereinbefore referred to. A spring, D', bears against a suitable stud or projection, $v'$, on the slide G, to retract the cutter F when the same is to be brought away from the bushing A' B'. The said spring may be attached to any suitable support—as, for example, the frame of the machine.

It is to be observed that when the lever E is operated to force the section A' toward the section B', as hereinbefore explained, the short arm of the said lever and the link $f$ are brought in line with each other and with the pivots $e$ and $g$, and in this position serve to bind the section A' upon the pipe or cylindrical rod, as the case may be, gripped between the said section A' and the section B', the pipe being of course released when the lever E is swung back toward the position represented in Fig. 1, in order that the section A' may come into the exact position required with reference to the section B' when moved toward the latter, as just set forth.

It is desirable that the section A' be capable of adjustment from time to time, as its recessed end becomes worn away by continued use. To provide for this the said section A' is placed within a guide, N', provided upon the slide D, the said guide N' being provided with a broad-headed stud-screw, $g'$, its inner end bearing upon the adjacent surface of the said section A', so that by tightening the said screw $g'$ the section A' is held against sliding within the guide. Passed through the side of the guide is a binding-screw, $h'$, the inner end of which presses against the adjacent side of the section A', and thereby tightens and assists in holding the same in place. A screw, $m'$, working through a fixed nut, $n'$, of the slide D bears against the outer end of the section A' to resist a longitudinal thrust upon the said section when gripped upon the pipe or rod, as hereinbefore explained. By loosening the screws $g'$, $h'$, and $m'$ the section A' may be adjusted to the required position, and by then tightening the said screws it may be held firmly in such position.

What I claim as my invention is—

1. The combination, with a bushing composed of a fixed recessed section, B', and a movable recessed section, A', of a lever, E, connected with the said section A', to move the same toward and from the fixed section B', and a sliding cutter, F, arranged to sever the pipe or rod when supported between the two said sections of the bushing, substantially as and for the purpose herein set forth.

2. The combination, with a bushing composed of a fixed recessed section, B', and a movable recessed section, A', of a lever, E, connected with the said section A', to move the same toward and from the fixed section B', a sliding cutter, F, arranged to sever the pipe or rod when supported between the two said sections of the bushing, and a lever, H, connected with and arranged to actuate the sliding cutter, substantially as and for the purpose herein set forth.

3. The combination, with a bushing composed of a fixed recessed section, B', and a movable recessed section, A', of a lever, E, connected with the said section A', to move the same toward and from the fixed section B', a sliding cutter, F, arranged to sever the pipe or rod when supported between the two said sections of the bushing, and screw-threading dies B B, arranged to receive and act upon one portion of the pipe or rod, as the case may be, while another portion thereof is supported by the sections A' and B' of the bushing, substantially as and for the purpose herein set forth.

4. The combination, with a bushing composed of a fixed recessed section, B', and a movable recessed section, A', of a lever, E, connected with the said section A', to move the same toward and from the fixed section B', a sliding cutter, F, arranged to sever the pipe or rod when supported between the two said sections of the bushing, a lever, H, connected with and arranged to actuate the sliding cutter, and screw-threading dies B B, arranged to receive and act upon one portion of the pipe or rod, as the case may be, while another portion thereof is supported by the sections A' and B' of the bushing, substantially as and for the purpose herein set forth.

5. The combination, with a bushing composed of a fixed recessed section, B', and a movable recessed section, A', of a lever, E, connected with the said section A', to move the same toward and from the fixed section B', a sliding cutter, F, arranged to sever the pipe or rod when supported between the two said sections of the bushing, a lever, H, connected with and arranged to actuate the sliding cutter, screw-threading dies B B, arranged to receive and act upon one portion of the pipe or rod, as the case may be, while another portion thereof is supported by the sections A' and B' of the bushing, and a lever, C, for actuating the dies B B, substantially as and for the purpose herein set forth.

6. The combination, with a bushing composed of a fixed recessed section, B', and a movable recessed section, A', of a lever, E, connected with the said section A', to move the same toward and from the fixed section B', a sliding cutter, F, arranged to sever the pipe or rod when supported between the two said sections of the bushing, and a spring, D', substantially as and for the purpose herein set forth.

7. The combination, with the bushing, of the lever E and link $f$, constructed to close and retain the two sections of the bushing together when the link and the short arm of the lever are brought in line with each other and with their respective pivots $e$ and $g$, substantially as and for the purpose herein set forth.

8. The combination, with the sections A' and B', composing the bushing, of the guide N' and screws $g'$, $h'$, and $m'$, all substantially as and for the purpose herein set forth.

9. The combination, with the sections A' and B', composing the bushing, of the lever E, link $f$, slide D, guide N', and screws $g'$, $h'$, and $m'$, all substantially as and for the purpose herein set forth.

ALEXANDER SAUNDERS.

Witnesses:
CHARLES A. HERBERT,
ALBERT C. AUBERY.